United States Patent
Arashi (10) Patent No.: US 7,716,539 B2
(45) Date of Patent: May 11, 2010

(54) SERIAL COMMUNICATION CONTROL SYSTEM

(75) Inventor: Masahiko Arashi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 230 days.

(21) Appl. No.: 11/943,727

(22) Filed: Nov. 21, 2007

(65) Prior Publication Data

US 2008/0120444 A1    May 22, 2008

(30) Foreign Application Priority Data

Nov. 21, 2006    (JP) .............................. 2006-313841

(51) Int. Cl.
- *G01R 31/28* (2006.01)
- *H04B 17/00* (2006.01)
- *H04L 12/26* (2006.01)

(52) U.S. Cl. .............................. 714/712; 714/E11.141; 398/17; 398/23; 398/24; 398/27; 370/216

(58) Field of Classification Search ................ 714/712, 714/E11.141; 398/17, 23, 24, 27; 370/216
See application file for complete search history.

(56) References Cited

U.S. PATENT DOCUMENTS 3,835,260 A * 9/1974 Prescher et al. ............. 379/237
6,157,967 A * 12/2000 Horst et al. .................... 710/19
2002/0099877 A1   7/2002 Hirabayashi et al.

FOREIGN PATENT DOCUMENTS

| EP | 0 577 006 A1 | 1/1994 |
| JP | 7-319841 A | 12/1995 |
| JP | 2003-187526 A | 7/2003 |
| JP | 2004-139319 A | 5/2004 |

OTHER PUBLICATIONS

European Search Report dated Mar. 27, 2008 (Six (6) pages).

* cited by examiner

*Primary Examiner*—John J Tabone, Jr.
(74) *Attorney, Agent, or Firm*—Crowell & Moring LLP (57) ABSTRACT

Disclosed is serial communication control system including: a first microcomputer; and a second microcomputer connected to the first microcomputer through a serial line, wherein the second microcomputer includes an R/B signal sending section to send one of a READY signal and a BUSY signal, the first microcomputer includes an R/B signal receiving section to receive the signal, and a first sending section to send first serial data to the second microcomputer when the R/B signal receiving section receives the READY signal, the second microcomputer includes a first receiving section to receive the first serial data, and a second sending section to send second serial data after the receiving operation of the first serial data by the first receiving section is completed and the R/B signal sending section thereafter sends the BUSY signal, and the first microcomputer includes a second receiving section to receive the second serial data.

5 Claims, 8 Drawing Sheets

SERIAL COMMUNICATION CONTROL SYSTEM

BACKGROUND OF THE INVENTION

1. Field of the Invention

The present invention relates to a serial communication control system.

2. Description of Related Art

There is known a disk reproducing device which controls communication between two microcomputers incorporated in the disk reproducing device using a clock signal (e.g., Japanese Patent Application Laid-open Publication No. 2003-187526, patent document 1, herein after). There is also known a serial control device which controls serial communication for inputting and outputting data into and from a CPU (Central Processing Unit) by using a clock signal, and which generates an interruption signal so that interruption of data which requires fast processing can be carried out (e.g., Japanese Patent Application Laid-open Publication No. H7-319841, patent document 2, herein after).

There is also known a serial control device in which UART (asynchronous type serial) is used in serial communication for sending and receiving data to and from a microcomputer, and it is determined whether data sent from a microcomputer is received by a the other party based on whether a receiving operation-completion signal sent from the other party is received (e.g., Japanese Patent Application Laid-open Publication No. 2004-139319, patent document 3, herein after).

However, if the serial control is performed using the clock signal in the serial communication as in the patent documents 1 and 2, the control becomes complicated and costs are increased.

Further, in the patent document 3, it is determined whether sent data is received by a third party based on a receiving operation-completion signal sent from the third party. However, when the receiving operation-completion signal is not received from the third party, it is only possible to again send the data, and it is not possible to determine whether the third party is in a state where the third party can receive data, and this is not efficient.

SUMMARY OF THE INVENTION

It is, therefore, a main object of the present invention to provide a serial communication control system capable of easily and efficiently establishing serial communication.

According to a first aspect of the present invention, there is provided a serial communication control system comprising:

a first microcomputer; and a second microcomputer connected to the first microcomputer through a serial line, wherein the second microcomputer includes an R/B signal sending section to send one of a READY signal indicative of a data-receivable state and a BUSY signal indicative of a data-non-receivable state to the first microcomputer, the first microcomputer includes an R/B signal receiving section to receive the READY signal or the BUSY signal sent from the R/B signal sending section, and a first sending section to send first serial data to the second microcomputer when the R/B signal receiving section receives the READY signal, the second microcomputer includes a first receiving section to receive the first serial data sent from the first sending section, and a second sending section to send second serial data to the first microcomputer after the receiving operation of the first serial data by the first receiving section is completed and the R/B signal sending section thereafter sends the BUSY signal to the first microcomputer, the first microcomputer includes a second receiving section to receive the second serial data sent from the second sending section, and a reset signal sending section to send a reset signal to the second microcomputer, the second microcomputer includes a reset signal receiving section to receive the reset signal sent from the reset signal sending section, the R/B signal sending section sends the READY signal to the first microcomputer when the second microcomputer is brought into the data-receivable state after the reset signal receiving section receives the reset signal, the first microcomputer includes a first error detecting section to detect a communication error based on whether the R/B signal receiving section receives the BUSY signal within a preset first time period after the sending operation of the first serial data by the first sending section is completed, and a second error detecting section to detect a communication error based on whether the second receiving section receives the second serial data from the second microcomputer within a preset second time period after the R/B signal receiving section receives the BUSY signal, the second microcomputer includes a communication error detecting section to detect a communication error based on a transmission rate of serial data sent from the first microcomputer and/or a parity added to the serial data sent from the first microcomputer, the R/B signal sending section sends the BUSY signal to the first microcomputer during a preset third time period when the communication error detecting section detects a communication error, and the first microcomputer includes a determining section to determine that a communication error is generated when a time length of the BUSY signal sent from the R/B signal sending section to the R/B signal receiving section is equal to the third time period.

According to a second aspect of the present invention, there is provided a serial communication control system comprising:

a first microcomputer; and a second microcomputer connected to the first microcomputer through a serial line, wherein the second microcomputer includes an R/B signal sending section to send one of a READY signal indicative of a data-receivable state and a BUSY signal indicative of a data-non-receivable state to the first microcomputer, the first microcomputer includes an R/B signal receiving section to receive the READY signal or the BUSY signal sent from the R/B signal sending section, and a first sending section to send first serial data to the second microcomputer when the R/B signal receiving section receives the READY signal, the second microcomputer includes a first receiving section to receive the first serial data sent from the first sending section, and a second sending section to send second serial data to the first microcomputer after the receiving operation of the first serial data by the first receiving section is completed and the R/B signal sending section thereafter sends the BUSY signal to the first microcomputer, and the first microcomputer includes a second receiving section to receive the second serial data sent from the second sending section.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, wherein.

DESCRIPTION OF THE PREFERRED EMBODIMENTS

The best mode for carrying out the serial communication control system according to the present invention will be explained in detail with reference to the drawings.

First, a structure of the serial communication control system 100 of the invention will be explained with reference to FIG. 1. As show in FIG. 1, the serial communication control system 100 of an embodiment includes a first microcomputer 1 and a second microcomputer 2 connected to the first microcomputer 1 through a serial line 3.

More specifically, the serial line 3 connecting the first microcomputer 1 and the second microcomputer 2 to each other includes a UART (Universal Asynchronous Receiver Transmitter: asynchronous type serial). Concretely, as shown in FIG. 1, the serial line 3 includes a signal line for sending a READY signal and a BUSY signal from the second microcomputer 2 to the first microcomputer 1, a signal line for sending serial data (first serial data) from the first microcomputer 1 to the second microcomputer 2, a signal line for sending serial data (second serial data) from the second microcomputer 2 to the first microcomputer 1, and a signal line for sending a reset signal from the first microcomputer 1 to the second microcomputer 2.

Here, the READY signal is a signal indicative of a state where the second microcomputer 2 can receive data, and the BUSY signal is a signal indicative of a state where the second microcomputer 2 cannot receive data.

Figure 1:
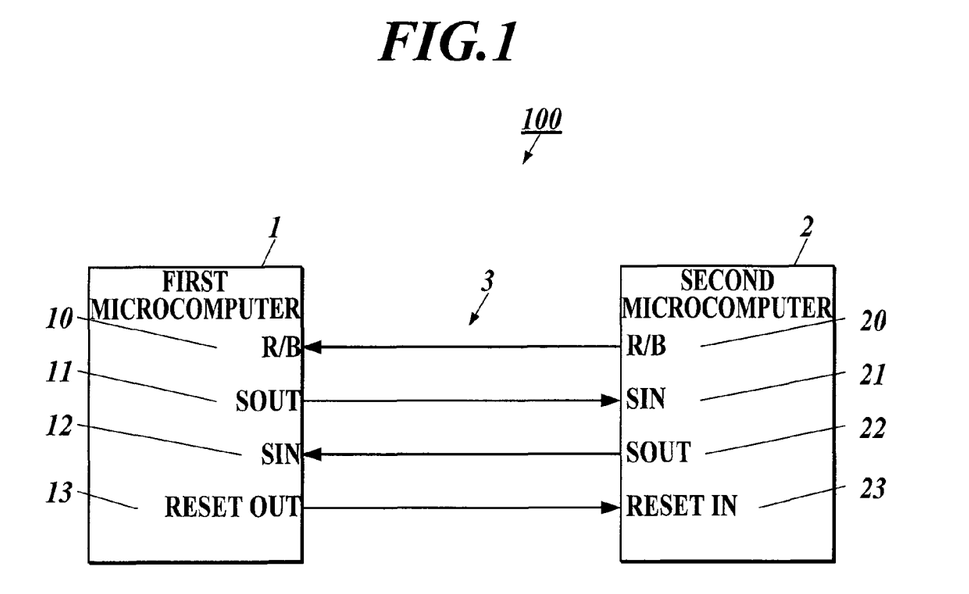
FIG. 1 is a schematic diagram showing a structure of a serial communication control system according to the present embodiment.
Figure 2:
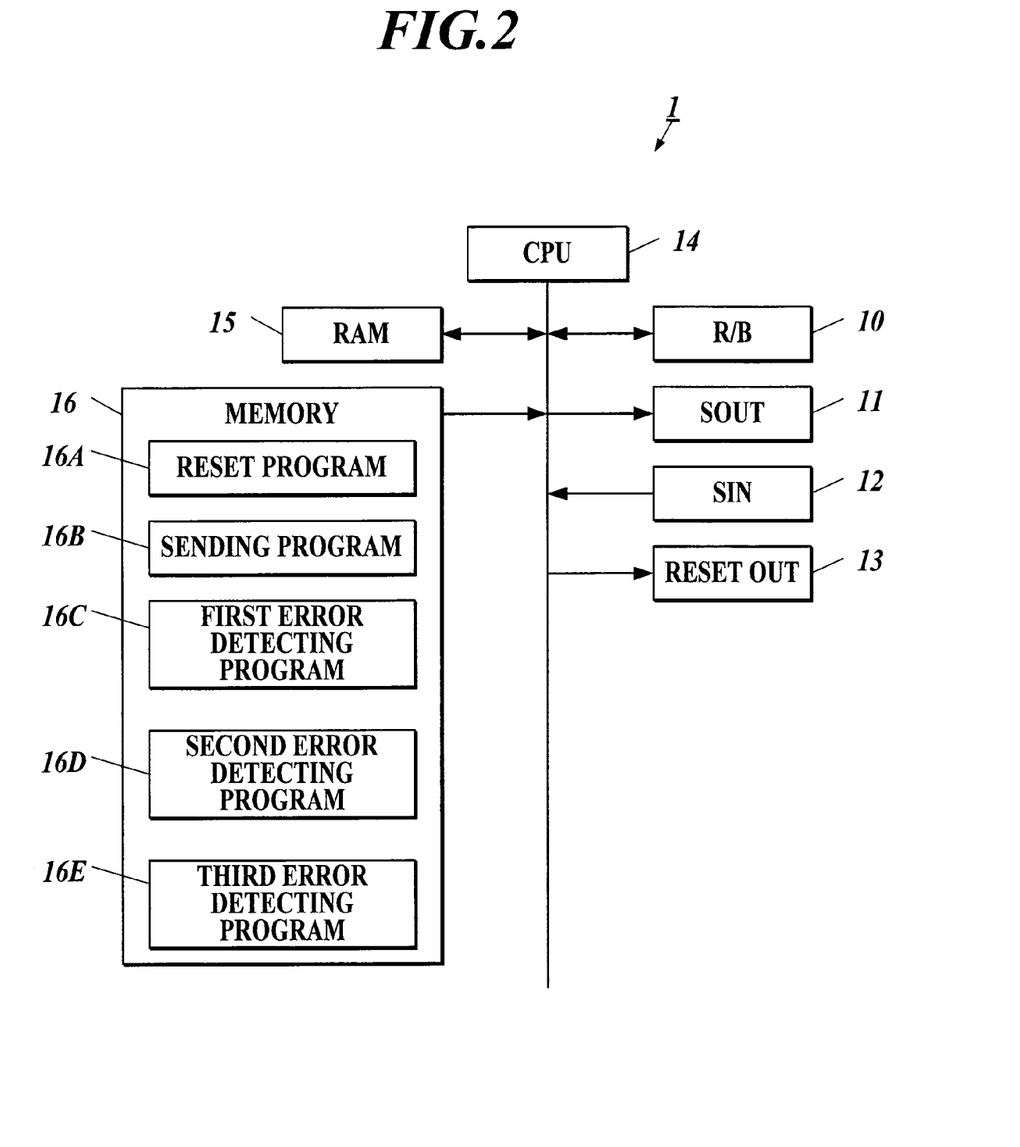
FIG. 2 is a block diagram showing one example of a structure of a first microcomputer of the present embodiment.

As shown in FIGS. 1 and 2, the first microcomputer 1 includes an R/B input terminal 10 (R/B signal receiving section) for receiving the READY signal or the BUSY signal sent from the second microcomputer 2, an SOUT output terminal 11 (first sending section) for sending serial data to the second microcomputer 2, an SIN input terminal 12 (second receiving section) for receiving serial data sent from the second microcomputer 2, and a RESET OUT output terminal 13 (reset signal sending section) for sending a reset signal to the second microcomputer 2.

Figure 3:
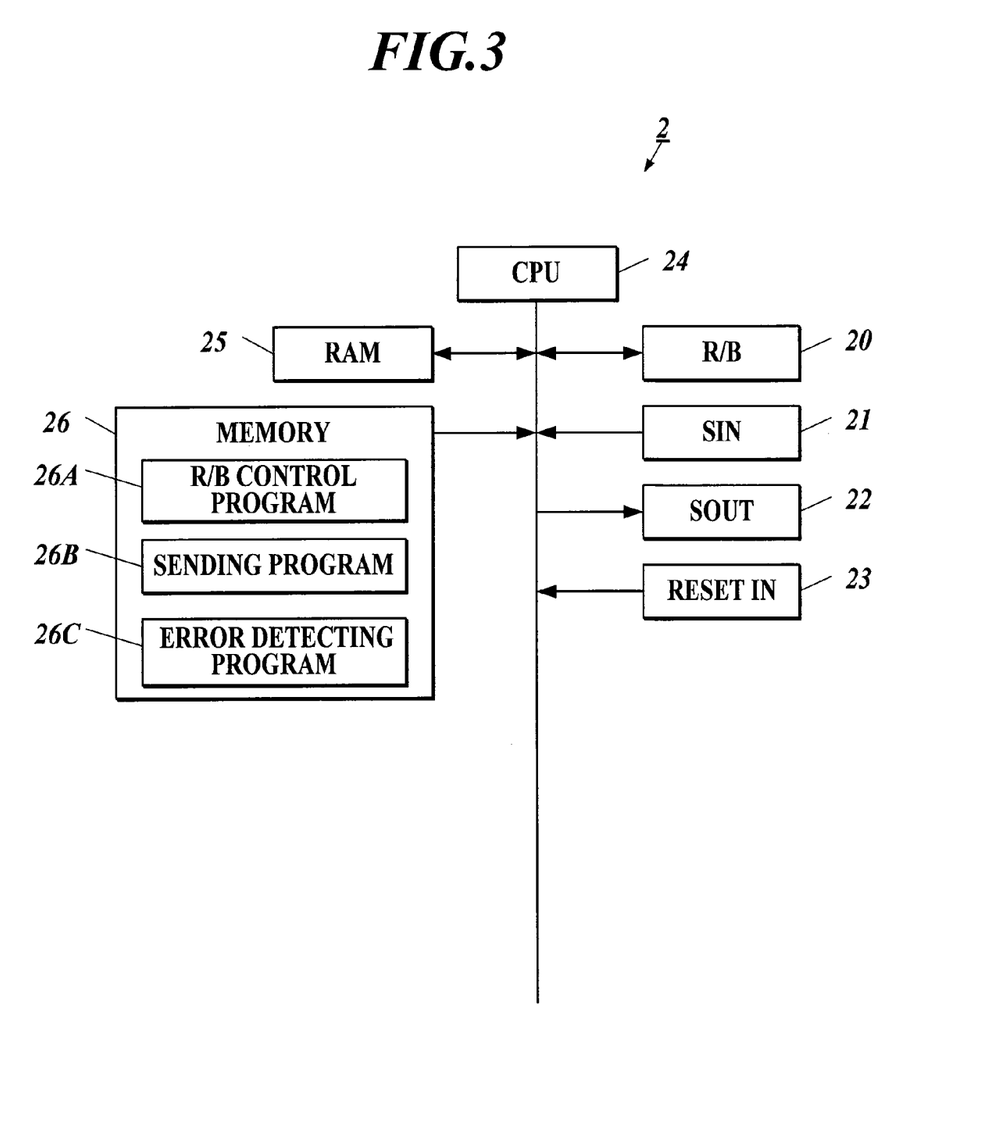
FIG. 3 is a block diagram showing one example of a structure of a second microcomputer of the present embodiment.

As shown in FIGS. 1 and 3, the second microcomputer 2 includes an R/B output terminal 20 (R/B signal sending section) for sending the READY signal or the BUSY signal to the first microcomputer 1, an SIN input terminal 21 (first receiving section) for receiving serial data sent from the first microcomputer 1, an SOUT output terminal 22 (second sending section) for sending serial data to the first microcomputer 1, and a RESET IN input terminal 23 (reset signal receiving section) for receiving a reset signal sent from the first microcomputer 1.

As shown in FIG. 2, the first microcomputer 1 includes the R/B input terminal 10 (R/B 10, hereinafter), the SOUT output terminal 11 (SOUT 11, hereinafter), the SIN input terminal 12 (SIN 12, hereinafter), the RESET OUT output terminal 13 (RESET OUT 13, hereinafter), a CPU (Central Processing Unit) 14, a RAM (Random Access Memory) 15 and a memory 16.

The CPU 14 reads a processing program stored in the memory 16, develops the program in the RAM 15 and executes the program, thereby controlling the entire first microcomputer 1.

The RAM 15 develops the processing program executed by the CPU 14 in a program storing region in the RAM 15, and stores input data and a processing result generated when the processing program is executed in a data storing region.

The memory 16 comprises a recording medium (not shown) in which a program and data are previously stored, and the recording medium comprises a semiconductor memory. Various data sets, various processing programs and data processed by executing the programs required by the CPU 14 to control the entire first microcomputer 1 are stored in the memory 16. More specifically, a reset program 16A, a sending program 16B, a first error detecting program 16C, a second error detecting program 16D and a third error detecting program 16E are stored in the memory 16 as shown in FIG. 2.

The reset program 16A makes the CPU 14 realize a function for sending a reset signal from the RESET OUT 13 to the second microcomputer 2 through the serial line 3. More specifically, the reset program 16A brings an output of the RESET OUT 13 into High, thereby making the CPU 14 realize a function for sending a reset signal to the second microcomputer 2. The CPU 14 executes the reset program 16A, thereby functioning as reset signal sending section.

The sending program 16B makes the CPU 14 realize a function for sending serial data from the SOUT 11 to the second microcomputer 2 through the serial line 3 when the R/B 10 receives a READY signal sent from the second microcomputer 2. The CPU 14 executes the sending program 16B, thereby functioning as the first sending section.

The first error detecting program 16C makes the CPU 14 execute the sending program 16B and detects a communication error based on whether a BUSY signal sent from the second microcomputer 2 is received by the R/B 10 within a first time period (e.g., 50 msec) after serial data is sent to the second microcomputer 2.

More specifically, the first error detecting program 16C makes the CPU 14 determine that a communication error is not generated when the R/B 10 receives a BUSY signal within the first time period after serial data is sent to the second microcomputer 2, and determine that a communication error is generated when the R/B 10 does not receive a BUSY signal within the first time period after serial data is sent to the second microcomputer 2.

The CPU 14 executes the first error detecting program 16C, thereby functioning as the first error detecting section.

The second error detecting program 16D makes the CPU 14 execute the first error detecting program 16C, and detect a communication error based on whether the SIN 12 receives serial data sent from the second microcomputer 2 within a second time period (e.g., 100 msec) after the R/B 10 receives a BUSY signal when it is determined that the R/B 10 receives a BUSY signal within the first time period after serial data is sent to the second microcomputer 2 and a communication error is not generated.

More specifically, the second error detecting program 16D makes the CPU 14 send serial data to the second microcomputer 2, and when the serial data sent from the second microcomputer 2 is received by the SIN 12 within the second time period after the R/B 10 receives a BUSY signal, it is determined that a communication error is not generated and serial data is sent to the second microcomputer 2, and when the serial data sent from the second microcomputer 2 is not received by the SIN 12 within the second time period after the R/B 10 receives the BUSY signal, it is determined that a communication error is generated.

A case in which in the second microcomputer 2, a later-described CPU 24 executes a later-described error detecting program 26C and a communication error is detected and the R/B output terminal 20 is brought into High during a third time period (e.g., 200 msec) corresponds to a case in which in the first microcomputer 1, serial data is sent to the second microcomputer 2, the serial data sent from the second microcomputer 2 is not received by the SIN 12 within the second time period after the R/B 10 receives the BUSY signal. In this case also, the CPU 14 executes the second error detecting program 16D and it is determined that a communication error is generated.

The CPU 14 executes the second error detecting program 16D, thereby functioning as second error detecting section and determining section.

When serial data is received from the second microcomputer 2, the third error detecting program 16E makes the CPU 14 detect a communication error based on a transmission rate of the serial data and a parity added to the serial data.

More specifically, the third error detecting program 16E makes the CPU 14 determine whether the transmission rate of the serial data sent from the second microcomputer 2 and the parity added to the serial data match with the transmission rate and the parity, and when they do not match, the third error detecting program 16E makes the CPU 14 determine that a communication error is generated.

As shown in FIG. 3, the second microcomputer 2 includes the R/B output terminal 20 (R/B 20, hereinafter), the SIN input terminal 21 (SIN 21, hereinafter) the SOUT output terminal 22 (SOUT 22, hereinafter), the RESET IN input terminal 23 (RESET IN 23, hereinafter), the CPU 24, a RAM 25 and a memory 26.

The CPU 24 reads a processing program stored in the memory 26, develops the processing program in the RAM 25 and executes the same, thereby controlling the entire second microcomputer 2.

The RAM 25 develops the processing program executed by the CPU 24 in a program storing region in the RAM 25, and stores input data and a processing result generated when the processing program is executed in a data storing region.

The memory 26 comprises a recording medium (not shown) in which a program and data are previously stored, and the recording medium comprises a semiconductor memory. Various data sets, various processing programs and data processed by executing the programs required by the CPU 24 to control the entire second microcomputer 2 are stored in the memory 26. More specifically, an R/B control program 26A, a sending program 26B, and an error detecting program 26C are stored in the memory 26 as shown in FIG. 3.

The R/B control program 26A makes the CPU 24 realize a function to send a READY signal from the R/B 20 to the first microcomputer 1 through the serial line 3 when the second microcomputer 2 is brought into the data-receivable state after a reset signal sent from the first microcomputer 1 is received by the RESET IN 23.

The R/B control program 26A makes the CPU 24 send a BUSY signal from the R/B 20 to the first microcomputer 1 through the serial line 3 when serial data sent from the first microcomputer 1 is received by the SIN 21.

The R/B control program 26A makes the CPU 24 send a BUSY signal to the first microcomputer 1 from the R/B 20 through the serial line 3 during the third time period (e.g., 200 msec) when a communication error is detected by executing a later-described error detecting program 26C.

More specifically, the R/B control program 26A makes the CPU 24 send a READY signal to the first microcomputer 1 by bringing an output of the R/B 20 into Low, and send a BUSY signal to the first microcomputer 1 by bringing the output of the R/B 20 into High.

The CPU 24 executes the R/B control program 26A, thereby functioning as the R/B signal sending section.

The sending program 26B makes the CPU 24 receive serial data from the first microcomputer 1, and makes the CPU 24 send serial data from the SOUT 22 to the first microcomputer 1 through the serial line 3 when the R/B 20 is brought into High by executing the R/B control program 26A. The CPU 24 executes the sending program 26B, thereby functioning the second sending section.

The error detecting program 26C makes the CPU 24 detect a communication error based on a transmission rate of serial data and a parity added to the serial data when the serial data is received from the first microcomputer 1.

More specifically, the error detecting program 26C makes the CPU 24 determine whether the transmission rate of the serial data sent from the first microcomputer 1 and the parity added to the serial data match with a transmission rate and a parity, and when they do not match, the CPU 24 determines that a communication error is generated.

The CPU 24 executes the error detecting program 26C, thereby functioning as communication error detecting section.

Figure 4:
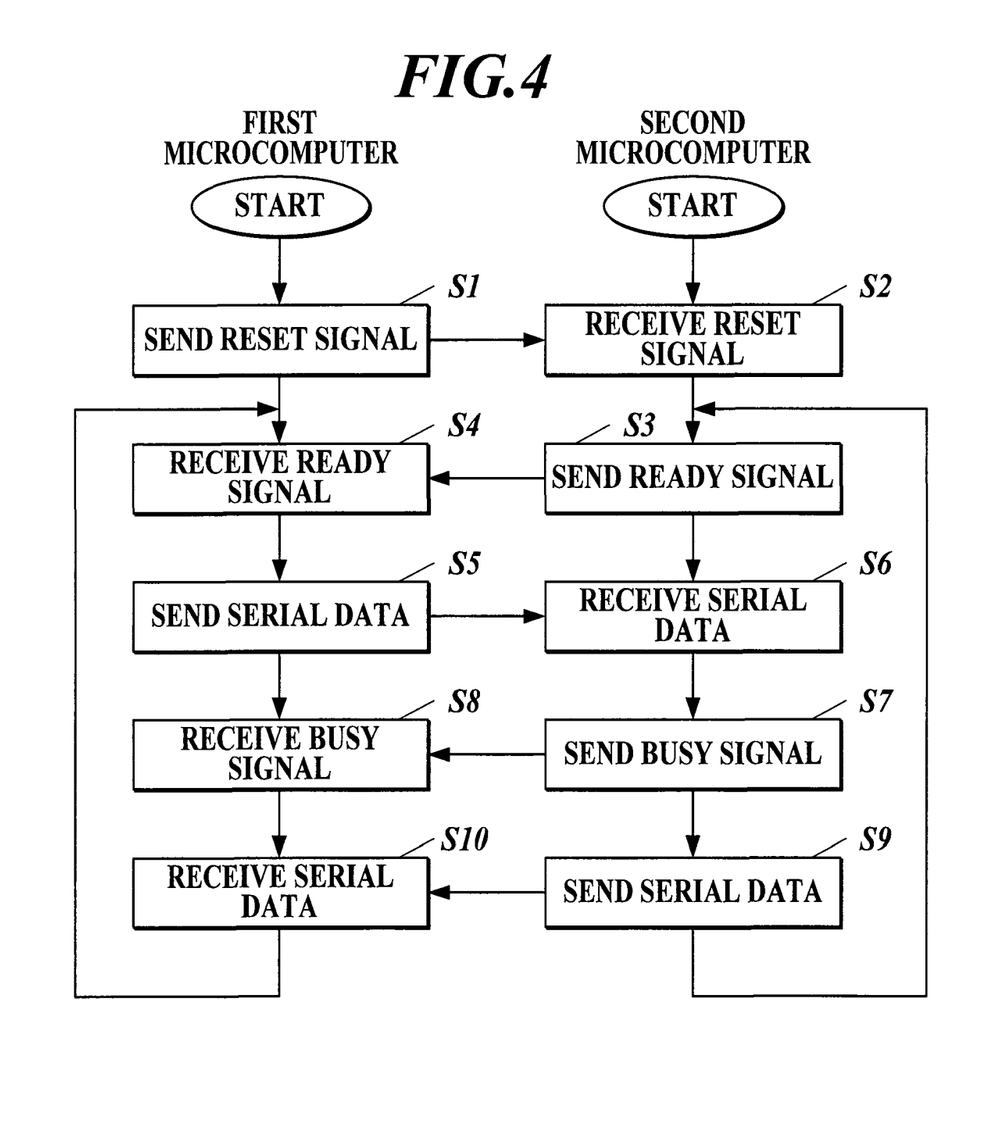
FIG. 4 is a flowchart for explaining one example of a sending/receiving operation of data in the serial communication control system of the present embodiment.

Next, sending and receiving operations of the serial communication control system 100 having the above-described structure will be explained with reference to a flowchart shown in FIG. 4.

First, in the first microcomputer 1, the CPU 14 executes the reset program 16A to bring an output of the RESET OUT 13 into High, thereby sending a reset signal to the second microcomputer 2 (step S1).

Next, in the second microcomputer 2, the reset signal sent from the first microcomputer 1 is received by the RESET IN 23 (step S2).

Then, when the second microcomputer 2 is brought into the data-receivable state, the CPU 24 executes the R/B control program 26A to bring an output of the R/B 20 into Low, and a READY signal is sent to the first microcomputer 1 (step S3).

Next, in the first microcomputer 1, if the READY signal sent from the second microcomputer 2 is received by the R/B 10 (step S4), the CPU 14 executes the sending program 16B, and serial data is sent to the second microcomputer 2 from the SOUT 11 through the serial line 3 (step S5).

Next, in second microcomputer 2, if the serial data sent from the first microcomputer 1 is received by the SIN 21 (step S6), the CPU 24 executes the R/B control program 26A to bring an output of the R/B 20 into High, and a BUSY signal is sent to the first microcomputer 1 (step S7).

Next, in the first microcomputer 1, the BUSY signal sent from the second microcomputer 2 is received by the R/B 10 (step S8).

Then, in the second microcomputer 2, the CPU 24 executes the sending program 26B, and serial data is sent to the first microcomputer 1 from the SOUT 22 through the serial line 3 (step S9), and the procedure is returned to step S3.

Next, in the first microcomputer 1, if the serial data sent from the second microcomputer 2 is received by the SIN 12 (step S10), the procedure is returned to the step S4.

Next, variation with time in a signal level in the sending and receiving operation of the serial communication control system 100 according to the embodiment will be explained with reference to a timing chart shown in FIG. 5.

Figure 5:
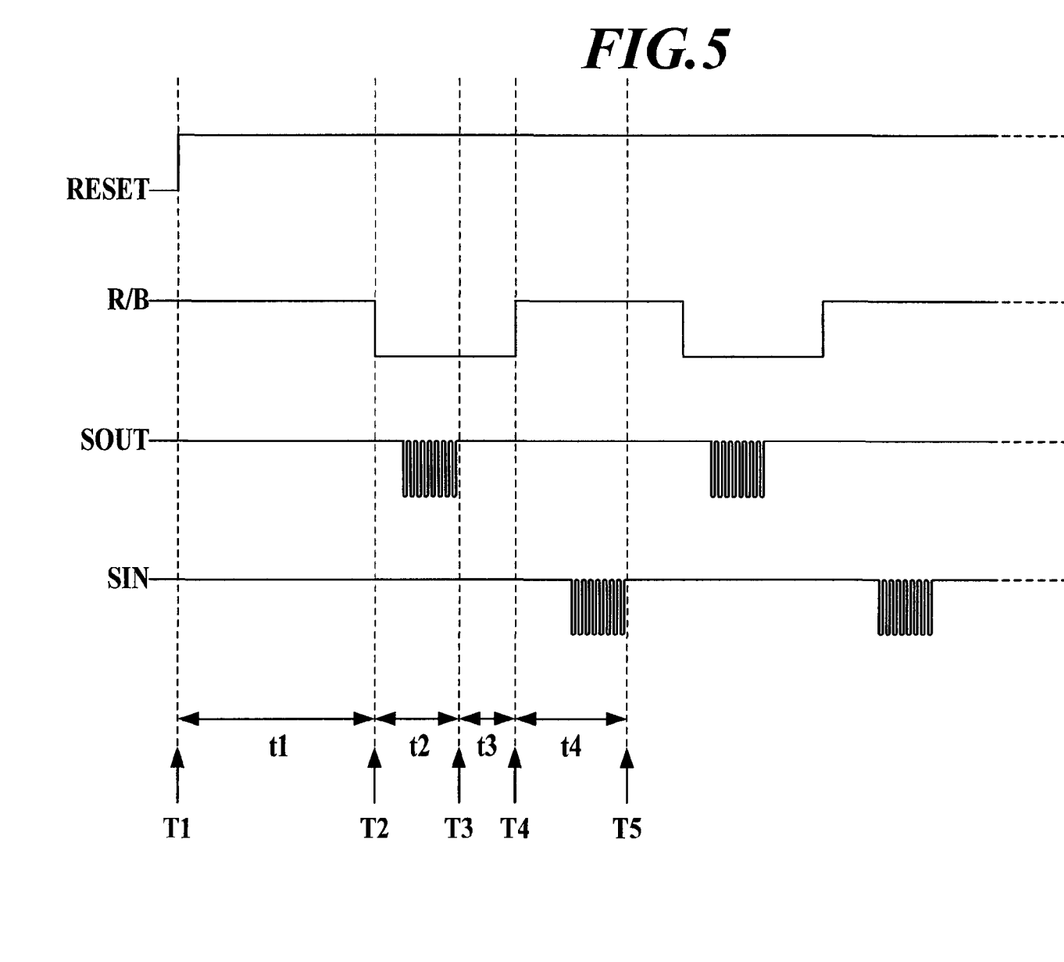
FIG. 5 is a timing chart for explaining one example of variation in signal level with time in the sending/receiving operation of the serial communication control system of the present embodiment.

In FIG. 5, the uppermost line shows variation with time in the signal levels of the RESET OUT 13 and the RESET IN 23. The second line shows variation with time in the signal levels of the R/B 10 and the R/B 20. The third line shows variation with time of the signal level of the SOUT 11 of the first microcomputer 1, and the lowermost line shows the signal level of the SIN 12 of the first microcomputer 1.

First, at time T1 in FIG. 5, the RESET OUT 13 of the first microcomputer 1 is brought into High, and a reset signal is sent from the first microcomputer 1 to the second microcomputer 2.

Next, if the second microcomputer 2 is brought into the data-receivable state, the R/B 20 of the second microcomputer 2 is brought into Low at time T2, and a READY signal is sent to the first microcomputer 1 from the second microcomputer 2.

Then, serial data is sent to the second microcomputer 2 from the first microcomputer 1.

Next, at time T3, after the sending operation of the serial data to the second microcomputer 2 from the first microcomputer 1 is completed, the R/B 20 of the second microcomputer 2 is brought into High at time T4, and a BUSY signal is sent to the first microcomputer 1 from the second microcomputer 2.

Then, the serial data sent from the second microcomputer 2 is received by the first microcomputer 1.

Next, at time T5, the receiving operation of the first microcomputer 1 of the serial data sent from the second microcomputer 2 is completed.

Thereafter, variation with time which is the same as that from time T2 to time T5 is repeated.

Figure 6:
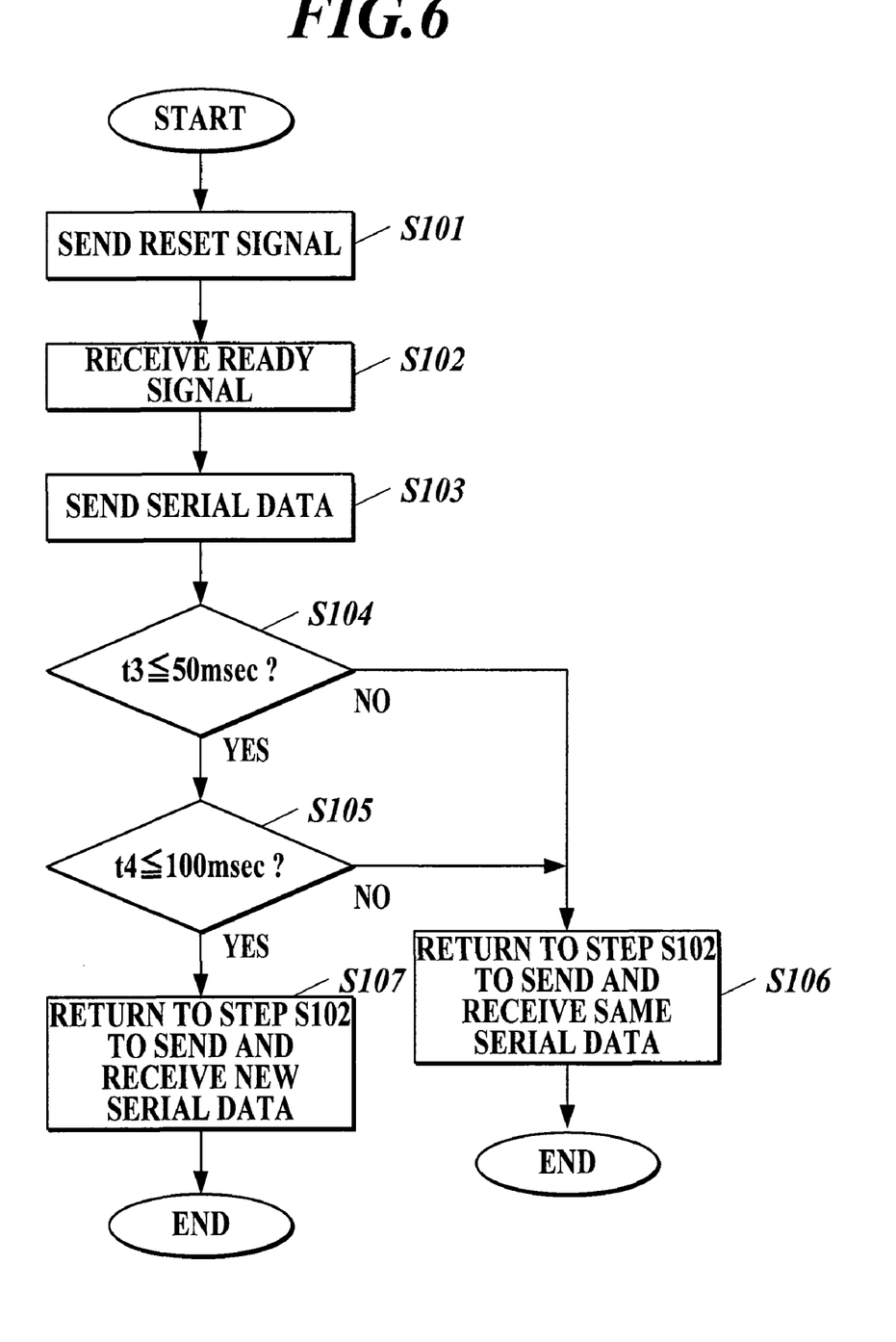
FIG. 6 is a flowchart for explaining one example of a communication error detecting operation after serial data is sent in the first microcomputer of the present embodiment.

Next, on example of a communication error detecting operation after serial data is sent in the first microcomputer 1 of the embodiment will be explained with reference to a flowchart shown in FIG. 6.

First, the CPU 14 executes the reset program 16A, and a reset signal is sent to the second microcomputer 2 (step S101).

Next, if a READY signal sent from the second microcomputer 2 is received (step S102), the CPU 14 executes the sending program 16B and serial data is sent to the second microcomputer 2 (step S103).

Next, the CPU 14 executes the first error detecting program 16C, and it is determined whether a BUSY signal is received from the second microcomputer 2 within 50 msec (first time period) after the sending operation of the serial data to the second microcomputer 2 is completed, i.e., whether a time period t3 between time T3 and time T4 in FIG. 5 is equal to or less than 50 msec (step S104).

When the CPU 14 determines that t3 is longer than 50 msec in step S104 (step S104; No), the procedure is advanced to step S106.

When the CPU 14 determines in step S104 that t3 is equal to or shorter than 50 msec, i.e., a BUSY signal is received from the second microcomputer 2 within 50 msec after the sending operation of the serial data to the second microcomputer 2 (step S104; Yes) is completed, the CPU 14 executes the second error detecting program 16D, and determines whether the receiving operation of serial data sent from the second microcomputer 2 is completed within 100 msec (second time period) after a BUSY signal is received from the second microcomputer 2, i.e., whether time period t4 between time T4 and time T5 in FIG. 5 is within 100 msec (step S105).

When the CPU 14 determines that t4 is longer than 100 msec in step S105 (step S105; No), the procedure is returned to step S102 to again send and receive the same serial data as the serial data which is sent and received in the above processing (step S106).

When the CPU 14 determines that t4 is within 100 msec in step S105, i.e., that the receiving operation of the serial data sent from the second microcomputer 2 is completed within 100 msec after the BUSY signal is received from the second microcomputer 2 (step S105; Yes), the procedure is returned to step S102 to send and receive new serial data (step S107).

Figure 7:
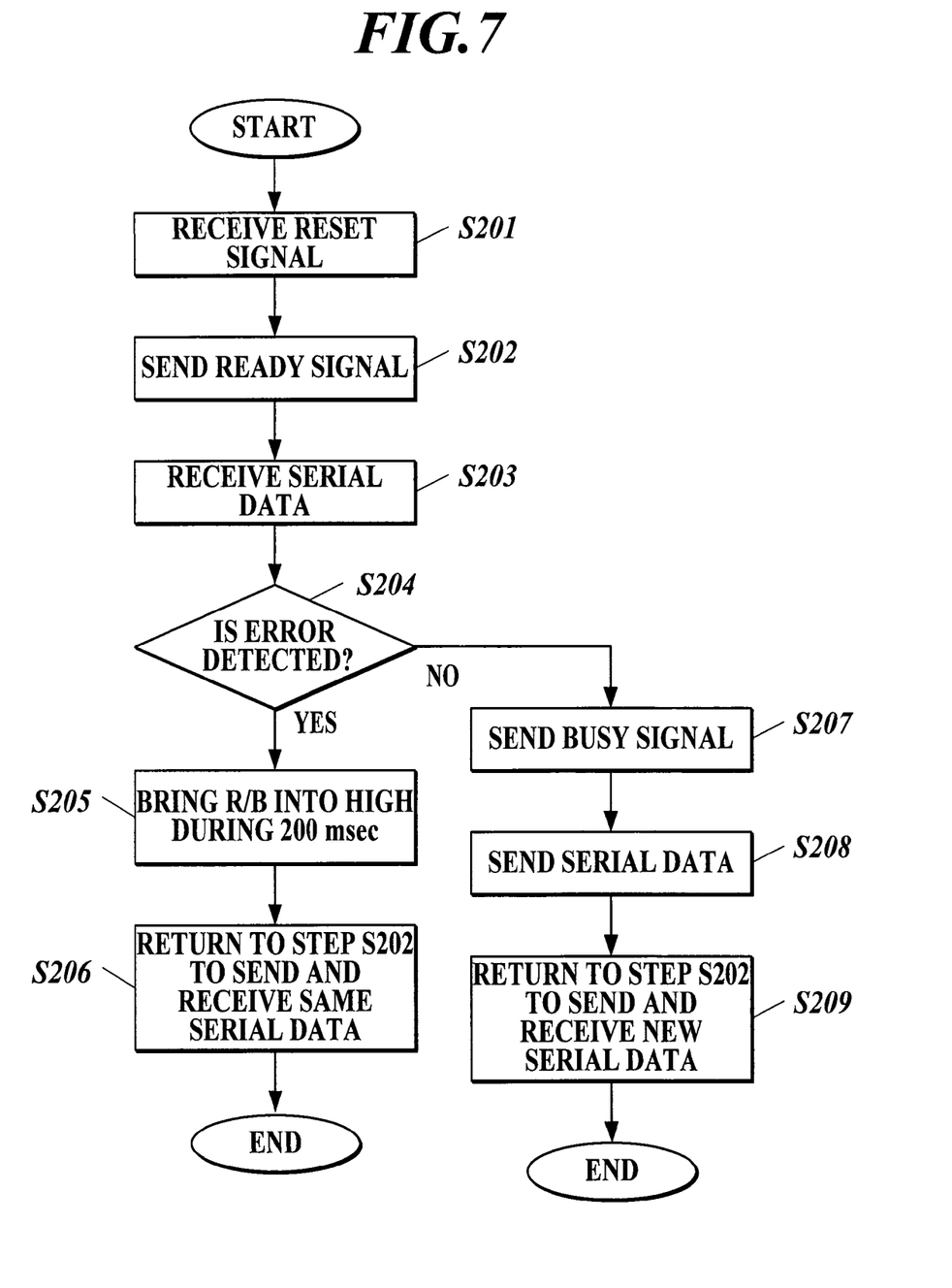
FIG. 7 is a flowchart for explaining one example of a communication error detecting operation after serial data is received in the second microcomputer of the present embodiment.

Next, one example of a communication error detecting operation when serial data is received in the second microcomputer 2 according to the embodiment will be explained with reference to a flowchart shown in FIG. 7.

First, a reset signal sent from the first microcomputer 1 is received (step S201).

Next, when the second microcomputer 2 is brought into the data-receivable state, the CPU 24 executes the R/B control program 26A to send a READY signal to the first microcomputer 1 (step S202).

Next, the second microcomputer 2 receives serial data sent from the first microcomputer 1 (step S203).

Next, the CPU 24 executes the error detecting program 26C and determines whether a communication error is generated based on a transmission rate of serial data received in step S203 and a parity added to the serial data (step S204).

When the CPU 24 determines that a communication error is generated in step S204 (step S204; Yes), the CPU 24 executes the R/B control program 26A and brings the R/B 20 into High during 200 msec (third time period) (step S205).

Next, the CPU 24 returns to step S202 to again receive the same serial data as the serial data which is received in the above processing (step S206).

When the CPU 24 determines that no communication error is generated in step S204 (step S204; No), the CPU 24 executes the R/B control program 26A to send a BUSY signal to the first microcomputer 1 (step S207), and executes the sending program 26B to send serial data to the first microcomputer 1 (step S208).

Next, the CPU 24 returns to step S202 to send and receive new serial data (step S209).

Figure 8:
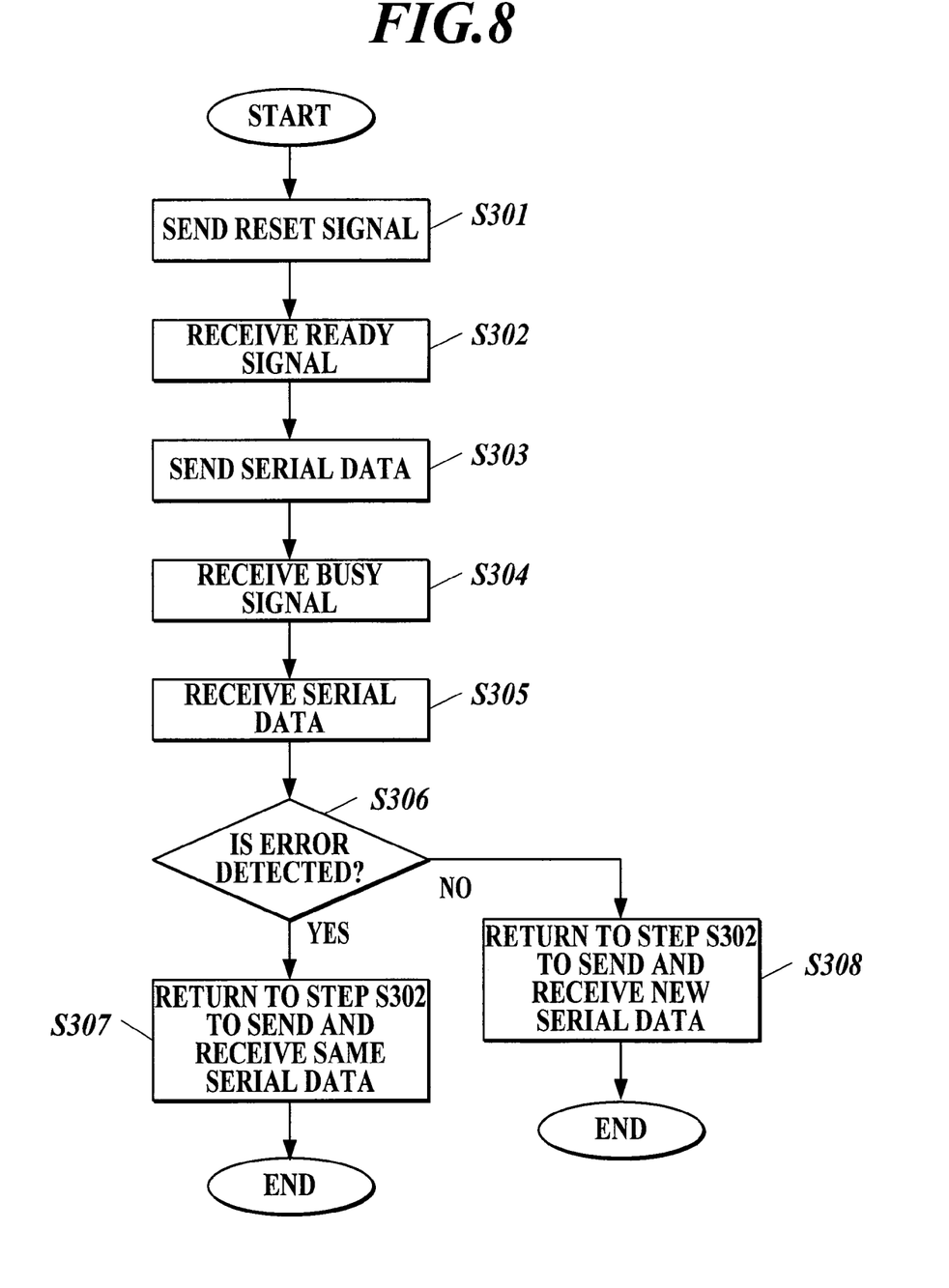
FIG. 8 is a flowchart for explaining one example of a communication error detecting operation after serial data is received in the first microcomputer of the present embodiment.

Next, one example of a communication error detecting operation when serial data is received in the first microcomputer 1 of the embodiment will be explained with reference to a flowchart in FIG. 8.

First, the CPU 14 executes the reset program 16A to send a reset signal to the second microcomputer 2 (step S301).

Next, if a READY signal sent from the second microcomputer 2 is received (step S302), the CPU 14 executes the sending program 16B and serial data is sent to the second microcomputer 2 (step S303).

Then, the BUSY signal sent from the second microcomputer 2 is received (step S304), and serial data sent from the second microcomputer 2 is received (step S305).

Next, the CPU 14 executes the third error detecting program 16E, and determines whether a communication error is generated based on a transmission rate of serial data received in step S305 and a parity added to the serial data (step S306).

If the CPU 14 determines that a communication error is generated in step S306 (step S306; Yes), the procedure is returned to step S302 to again send and receive the same serial data as the serial data which is received in the above processing (step S307).

When the CPU 14 determines that a communication error is not generated in step S306 (step S306; No), the procedure is returned to step S302 to send and receive new serial data (step S308).

According to the serial communication control system 100 according to the embodiment of the present invention explained above, in the second microcomputer 2, one of a READY signal indicative of a data-receivable state and a BUSY signal indicative of a data-non-receivable state is sent to the first microcomputer 1 by the R/B 20, and when the READY signal or the BUSY signal sent by the R/B 20 is received by the R/B 10 and the READY signal is received by the R/B 10 by the SOUT 11 in the first microcomputer 1, serial data is sent to the second microcomputer 2. In the second microcomputer 2, serial data sent by the SOUT 11 is received by the SIN 21. After the receiving operation of the serial data by the SIN 21 is completed by the SOUT 22, a BUSY signal is sent to the first microcomputer 1 by the R/B 20. After that, serial data is sent to the first microcomputer 1, and in the first microcomputer 1, the serial data sent by the SOUT 22 is received by the SIN 12. Therefore, it is possible to determine whether the second microcomputer 2 is in the data-receivable state depending on whether the READY signal is received by the R/B 10 without using the clock signal, and it is possible to easily and efficiently establish the serial communication.

In the first microcomputer 1, a reset signal is sent to the second microcomputer 2 by the RESET OUT 13. In the second microcomputer 2, the reset signal sent by the RESET OUT 13 is received by the RESET IN 23. When the second microcomputer 2 is brought into the data-receivable state after the reset signal by the RESET IN 23 is received by the R/B 20, the READY signal is sent to the first microcomputer 1. Therefore, the first microcomputer 1 and second microcomputer 2 can be brought into synchronism with each other by sending the reset signal from the first microcomputer 1 for resetting the second microcomputer 2, and it is possible to easily control the communication starting timing.

In the first microcomputer 1, the CPU 14 executes the first error detecting program 16C, and detects a communication error based on whether a BUSY signal is received by the R/B 10 within a first time period after the sending operation of serial data by the SOUT 11 is completed. Therefore, it is possible to more easily detect a communication error generated after serial data is sent from the first microcomputer 1 to the second microcomputer 2 and until the serial data sent from the first microcomputer 1 is received by the second microcomputer 2.

In the first microcomputer 1, the CPU 14 executes the second error detecting program 16D and detects a communication error based on whether serial data is received from the second microcomputer 2 by the SIN 12 within a preset second time period after a BUSY signal is received by the R/B 10. Therefore, it is possible to more easily detect a communication error generated after the serial data sent from the first microcomputer 1 is received by the second microcomputer 2 and until serial data is sent to the first microcomputer 1 from the second microcomputer 2.

In the second microcomputer 2, the CPU 24 executes the error detecting program 26C, and detects a communication error based on a transmission rate of serial data sent from the first microcomputer 1 and/or a parity added to the serial data sent from the first microcomputer 1, the CPU 24 executes the error detecting program 26C and when a communication error is detected by the R/B 20, a BUSY signal is sent to the first microcomputer 1 during a preset third time period, and in the first microcomputer 1, the CPU 14 executes the second error detecting program 16D and when length of the BUSY signal received by the R/B 10 is equal to the third time period, it is determined that a communication error is generated. Therefore, it is possible to more easily detect a framing error or a parity error.

In the embodiment, the first time period is set to 50 msec, the second time period is set to 100 msec and the third time period is set to 2000 msec, but the first time period, the second time period and the third time period may appropriately be changed in accordance with a transmission rate of serial data and a data amount.

A reset signal may not be sent to the second microcomputer 2 from the first microcomputer 1.

The first microcomputer 1 and the second microcomputer 2 are not limited only if they are electric equipment which can be serially connected to each other. For example, the first microcomputer 1 may be a television set such as a digital television, and the second microcomputer 2 may be a recording/reproducing device such as a DVD recorder player connected to the television.

According to a first aspect of the preferred embodiments of the present invention, there is provided a serial communication control system comprising:

a first microcomputer; and a second microcomputer connected to the first microcomputer through a serial line, wherein the second microcomputer includes an R/B signal sending section to send one of a READY signal indicative of a data-receivable state and a BUSY signal indicative of a data-non-receivable state to the first microcomputer, the first microcomputer includes an R/B signal receiving section to receive the READY signal or the BUSY signal sent from the R/B signal sending section, and a first sending section to send first serial data to the second microcomputer when the R/B signal receiving section receives the READY signal, the second microcomputer includes a first receiving section to receive the first serial data sent from the first sending section, and a second sending section to send second serial data to the first microcomputer after the receiving operation of the first serial data by the first receiving section is completed and the R/B signal sending section thereafter sends the BUSY signal to the first microcomputer, the first microcomputer includes a second receiving section to receive the second serial data sent from the second sending section, and a reset signal sending section to send a reset signal to the second microcomputer, the second microcomputer includes a reset signal receiving section to receive the reset signal sent from the reset signal sending section, the R/B signal sending section sends the READY signal to the first microcomputer when the second microcomputer is brought into the data-receivable state after the reset signal receiving section receives the reset signal, the first microcomputer includes a first error detecting section to detect a communication error based on whether the R/B signal receiving section receives the BUSY signal within a preset first time period after the sending operation of the first serial data by the first sending section is completed, and a second error detecting section to detect a communication error based on whether the second receiving section receives the second serial data from the second microcomputer within a preset second time period after the R/B signal receiving section receives the BUSY signal, the second microcomputer includes a communication error detecting section to detect a communication error based on a transmission rate of serial data sent from the first microcomputer and/or a parity added to the serial data sent from the first microcomputer, the R/B signal sending section sends the BUSY signal to the first microcomputer during a preset third time period when the communication error detecting section detects a communication error, and the first microcomputer includes a determining section to determine that a communication error is generated when a time length of the BUSY signal sent from the R/B signal sending section to the R/B signal receiving section is equal to the third time period.

According to the first aspect, in a second microcomputer, one of a READY signal indicative of a data-receivable state and a BUSY signal indicative of a data-non-receivable state is sent to a first microcomputer by R/B signal sending section, in a first microcomputer, the READY signal or the BUSY signal sent by the R/B signal sending section is received by an R/B signal receiving section, when the READY signal is received by the R/B signal receiving section, the first sending section sends first serial data to the second microcomputer, in the second microcomputer, first serial data sent by the first sending section is received by the first receiving section, after a receiving operation of the first serial data is completed by the first receiving section, and after the BUSY signal is sent to the first microcomputer by the R/B signal sending section, the second serial data is sent to the first microcomputer by the second sending section, in the first microcomputer, the second serial data sent by the second sending section is received by the second receiving section. Therefore, it is possible to determine whether the second microcomputer is in the data-receivable state depending on whether the READY signal is received by the R/B signal receiving section without using the clock signal, and it is possible to easily and efficiently establish the serial communication.

In the first microcomputer, a reset signal is sent to the second microcomputer by reset signal sending section, in the second microcomputer, the reset signal sent by the reset signal sending section is received by reset signal receiving section, and when the second microcomputer is brought into a data-receivable state by the R/B signal sending section after the reset signal is received by the reset signal receiving section, the READY signal is sent to the first microcomputer. Therefore, the first microcomputer and second microcomputer can be brought into synchronism with each other by sending the reset signal from the first microcomputer for resetting the second microcomputer, and it is possible to easily control the communication starting timing.

In the first microcomputer, a communication error is detected based on whether the BUSY signal is received by the R/B signal receiving section within a preset first time period after the sending operation of the first serial data is completed by the first sending section by the first error detecting section. Therefore, it is possible to more easily detect a communication error generated after serial data (first serial data) is sent from the first microcomputer to the second microcomputer and until the serial data sent from the first microcomputer is received by the second microcomputer.

In the first microcomputer, a communication error is detected by the second error detecting section based on whether second serial data is received by the second receiving section from the second microcomputer within a preset second time period after the BUSY signal is received by the R/B signal receiving section. Therefore, it is possible to more easily detect a communication error generated after the serial data (first serial data) sent from the first microcomputer is received by the second microcomputer and until serial data (second serial data) is sent to the first microcomputer from the second microcomputer.

In the second microcomputer, a communication error is detected by communication error detecting section based on a transmission rate of serial data sent from the first microcomputer and/or a parity added to serial data sent from the first microcomputer, and when the communication error is detected by the communication error detecting section, the BUSY signal is sent to the first microcomputer by the R/B signal sending section during a preset third time period, and in the first microcomputer, when a length of the BUSY signal received by the R/B signal receiving section is equal to the third time period, the determining section determines that a communication error is generated. Therefore, it is possible to more easily detect a framing error or a parity error.

According to a second aspect of the preferred embodiments of the present invention, there is provided a serial communication control system comprising:

a first microcomputer; and a second microcomputer connected to the first microcomputer through a serial line, wherein the second microcomputer includes an R/B signal sending section to send one of a READY signal indicative of a data-receivable state and a BUSY signal indicative of a data-non-receivable state to the first microcomputer, the first microcomputer includes an R/B signal receiving section to receive the READY signal or the BUSY signal sent from the R/B signal sending section, and a first sending section to send first serial data to the second microcomputer when the R/B signal receiving section receives the READY signal, the second microcomputer includes a first receiving section to receive the first serial data sent from the first sending section, and a second sending section to send second serial data to the first microcomputer after the receiving operation of the first serial data by the first receiving section is completed and the R/B signal sending section thereafter sends the BUSY signal to the first microcomputer, and the first microcomputer includes a second receiving section to receive the second serial data sent from the second sending section.

According to the second aspect, in a second microcomputer, one of a READY signal indicative of a data-receivable state and a BUSY signal indicative of a data-non-receivable state is sent to a first microcomputer by R/B signal sending section, in a first microcomputer, the READY signal or the BUSY signal sent by the R/B signal sending section is received by an R/B signal receiving section, when the READY signal is received by the R/B signal receiving section, the first sending section sends first serial data to the second microcomputer, in the second microcomputer, first serial data sent by the first sending section is received by the first receiving section, after a receiving operation of the first serial data is completed by the first receiving section, and after the BUSY signal is sent to the first microcomputer by the R/B signal sending section, the second serial data is sent to the first microcomputer by the second sending section, in the first microcomputer, the second serial data sent by the second sending section is received by the second receiving section. Therefore, it is possible to determine whether the second microcomputer is in the data-receivable state depending on whether the READY signal is received by the R/B signal receiving section without using the clock signal, and it is possible to easily and efficiently establish the serial communication.

Preferably in the serial communication control system of the second aspect, the first microcomputer includes a reset signal sending section to send a reset signal to the second microcomputer, the second microcomputer includes a reset signal receiving section to receive the reset signal sent from the reset signal sending section, and the R/B signal sending section sends the READY signal to the first microcomputer when the second microcomputer is brought into the data-receivable state after the reset signal receiving section receives the reset signal.

By the above feature, in the first microcomputer, a reset signal is sent to the second microcomputer by reset signal sending section, in the second microcomputer, the reset signal sent by the reset signal sending section is received by reset signal receiving section, and when the second microcomputer is brought into a data-receivable state by the R/B signal sending section after the reset signal is received by the reset signal receiving section, the READY signal is sent to the first microcomputer. Therefore, the first microcomputer and second microcomputer can be brought into synchronism with each other by sending the reset signal from the first microcomputer for resetting the second microcomputer, and it is possible to easily control the communication starting timing.

Preferably, in the serial communication control system of the second aspect, the first microcomputer includes a first error detecting section to detect a communication error based on whether the R/B signal receiving section receives the BUSY signal within a preset first time period after the sending operation of the first serial data by the first sending section is completed.

By the above feature, in the first microcomputer, a communication error is detected based on whether the BUSY signal is received by the R/B signal receiving section within a preset first time period after the sending operation of the first serial data is completed by the first sending section by the first error detecting section. Therefore, it is possible to more easily detect a communication error generated after serial data (first serial data) is sent from the first microcomputer to the second microcomputer and until the serial data sent from the first microcomputer is received by the second microcomputer.

Preferably, in the serial communication control system of the second aspect, the first microcomputer includes a second error detecting section to detect a communication error based on whether the second receiving section receives the second serial data from the second microcomputer within a preset second time period after the R/B signal receiving section receives the BUSY signal.

By the above feature, in the first microcomputer, a communication error is detected by the second error detecting section based on whether second serial data is received by the second receiving section from the second microcomputer within a preset second time period after the BUSY signal is received by the R/B signal receiving section. Therefore, it is possible to more easily detect a communication error generated after the serial data (first serial data) sent from the first microcomputer is received by the second microcomputer and until serial data (second serial data) is sent to the first microcomputer from the second microcomputer.

Preferably, in the serial communication control system of the second aspect, the second microcomputer includes a communication error detecting section to detect a communication error based on a transmission rate of serial data sent from the first microcomputer and/or a parity added to the serial data sent from the first microcomputer, the R/B signal sending section sends the BUSY signal to the first microcomputer during a preset third time period when the communication error detecting section detects a communication error, and the first microcomputer includes a determining section to determine that a communication error is generated when a time length of the BUSY signal received from the R/B signal receiving section to the R/B signal receiving section is equal to the third time period.

By the above feature, in the second microcomputer, a communication error is detected by communication error detecting section based on a transmission rate of serial data sent from the first microcomputer and/or a parity added to serial data sent from the first microcomputer, and when the communication error is detected by the communication error detecting section, the BUSY signal is sent to the first microcomputer by the R/B signal sending section during a preset third time period, and in the first microcomputer, when a length of the BUSY signal received by the R/B signal receiving section is equal to the third time period, the determining section determines that a communication error is generated. Therefore, it is possible to more easily detect a framing error or a parity error.

The entire disclosure of Japanese Patent Application No. 2006-313841 filed on Nov. 21, 2006 including description, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A serial communication control system comprising:
a first microcomputer; and
a second microcomputer connected to the first microcomputer through a serial line, wherein
the second microcomputer includes an R/B signal sending section to send one of a READY signal indicative of a data-receivable state and a BUSY signal indicative of a data-non-receivable state to the first microcomputer,
the first microcomputer includes an R/B signal receiving section to receive the READY signal or the BUSY signal sent from the R/B signal sending section, and a first sending section to send first serial data to the second microcomputer when the R/B signal receiving section receives the READY signal,
the second microcomputer includes a first receiving section to receive the first serial data sent from the first sending section, and a second sending section to send second serial data to the first microcomputer after the receiving operation of the first serial data by the first receiving section is completed and the R/B signal sending section thereafter sends the BUSY signal to the first microcomputer, the first microcomputer includes a second receiving section to receive the second serial data sent from the second sending section, and a reset signal sending section to send a reset signal to the second microcomputer, the second microcomputer includes a reset signal receiving section to receive the reset signal sent from the reset signal sending section, the R/B signal sending section sends the READY signal to the first microcomputer when the second microcomputer is brought into the data-receivable state after the reset signal receiving section receives the reset signal, the first microcomputer includes a first error detecting section to detect a communication error based on whether the R/B signal receiving section receives the BUSY signal within a preset first time period after the sending operation of the first serial data by the first sending section is completed, and a second error detecting section to detect a communication error based on whether the second receiving section receives the second serial data from the second microcomputer within a preset second time period after the R/B signal receiving section receives the BUSY signal, the second microcomputer includes a communication error detecting section to detect a communication error based on a transmission rate of serial data sent from the first microcomputer and/or a parity added to the serial data sent from the first microcomputer, the R/B signal sending section sends the BUSY signal to the first microcomputer during a preset third time period when the communication error detecting section detects a communication error, and the first microcomputer includes a determining section to determine that a communication error is generated when a time length of the BUSY signal sent from the R/B signal sending section to the R/B signal receiving section is equal to the preset third time period.

2. A serial communication control system comprising:

a first microcomputer; and a second microcomputer connected to the first microcomputer through a serial line, wherein the second microcomputer includes an R/B signal sending section to send one of a READY signal indicative of a data-receivable state and a BUSY signal indicative of a data-non-receivable state to the first microcomputer, the first microcomputer includes an R/B signal receiving section to receive the READY signal or the BUSY signal sent from the R/B signal sending section, and a first sending section to send first serial data to the second microcomputer when the R/B signal receiving section receives the READY signal, the second microcomputer includes a first receiving section to receive the first serial data sent from the first sending section, and a second sending section to send second serial data to the first microcomputer after the receiving operation of the first serial data by the first receiving section is completed and the R/B signal sending section thereafter sends the BUSY signal to the first microcomputer, and the first microcomputer includes a second receiving section to receive the second serial data sent from the second sending section, the second microcomputer includes a communication error detecting section to detect a communication error based on a transmission rate of serial data sent from the first microcomputer and/or a parity added to the serial data sent from the first microcomputer, the R/B signal sending section sends the BUSY signal to the first microcomputer during a preset third time period when the communication error detecting section detects a communication error, and the first microcomputer includes a determining section to determine that a communication error is generated when a time length of the BUSY signal received by the R/B signal receiving section is equal to the preset third time period.

3. The serial communication control system according to claim 2, wherein the first microcomputer includes a reset signal sending section to send a reset signal to the second microcomputer, the second microcomputer includes a reset signal receiving section to receive the reset signal sent from the reset signal sending section, and the R/B signal sending section sends the READY signal to the first microcomputer when the second microcomputer is brought into the data-receivable state after the reset signal receiving section receives the reset signal.

4. The serial communication control system according to claim 2, wherein the first microcomputer includes a first error detecting section to detect a communication error based on whether the R/B signal receiving section receives the BUSY signal within a preset first time period after the sending operation of the first serial data by the first sending section is completed.

5. The serial communication control system according to claim 2, wherein the first microcomputer includes a second error detecting section to detect a communication error based on whether the second receiving section receives the second serial data from the second microcomputer within a preset second time period after the R/B signal receiving section receives the BUSY signal.

* * * * *